United States Patent [19]

Masumoto et al.

[11] Patent Number: 5,518,522
[45] Date of Patent: May 21, 1996

[54] DEFORMED ULTRA FINE GRAINS AND PROCESS FOR PRODUCING SAME IN BULK

[75] Inventors: Tsuyoshi Masumoto, Kamisgi 3-chome, Aoba-ku, Sendai-shi; Akihisa Inoue, Kawauchi Jutaku, 11-806, Kawauchi, Aoba-ku, Sendai-shi, both of Miyagi-ken; Tadashi Yamaguchi, Miyagi; Katsutoshi Nosaki, Saitama, all of Japan

[73] Assignees: Tsuyoshi Masumoto; Akihisa Inoue, both of Miyagi; Yoshida Kogyo K.K.; Honda Giken Kogyo Kabushiki Kaisha, both of Tokyo, all of Japan

[21] Appl. No.: 209,148

[22] Filed: Mar. 10, 1994

[30] Foreign Application Priority Data

Mar. 15, 1993 [JP] Japan .................................. 5-080036

[51] Int. Cl.[6] ........................................................ B22F 9/14
[52] U.S. Cl. ............................ 75/255; 75/336; 75/343; 75/346
[58] Field of Search .............................. 75/255, 336, 343, 75/345, 346, 953, 954

[56] References Cited

U.S. PATENT DOCUMENTS

| 4,756,746 | 7/1988 | Kemp, Jr. et al. | 75/346 |
| 4,780,131 | 10/1988 | Kemp, Jr. et al. | 75/346 |

FOREIGN PATENT DOCUMENTS

| 4117141A | 11/1992 | Germany . | |
| 4280906 | 10/1992 | Japan | 75/336 |

*Primary Examiner*—Scott Kastler
*Attorney, Agent, or Firm*—Lyon & Lyon

[57] ABSTRACT

A deformed ultra fine grain is comprised of a spherical body and a tail-like projection projecting from the surface of the spherical body. The tail-like projection exhibits a separating effect on the adjacent deformed ultra fine grains and therefore, aggregation of the ultra fine grains is avoided. Bulk quantities of the deformed ultra fine grains are produced by evaporating a metal by a plasma arc in a controlled atmosphere having a gas that combines with the material of the spherical body to form the tail-like projection.

24 Claims, 9 Drawing Sheets

DEFORMED ULTRA FINE GRAINS AND PROCESS FOR PRODUCING SAME IN BULK

BACKGROUND OF THE INVENTION

1. Field of the Invention

The present invention relates to deformed ultra fine grains and processes for producing same in bulk.

2. Description of the Prior Art

There are various conventionally known types of ultra fine grains (for example, see Japanese Patent Application Laid-open Nos. 38505/90 and 294417/90).

However, all of the prior art ultra fine grains are spherical in shape and hence, they are liable to become aggregated and, if the ultra fine grains are used, for example, as a catalyst element for conversion of an exhaust gas from an automobile engine, a sufficient catalytic activity cannot be obtained.

SUMMARY OF THE INVENTION

Accordingly, it is an object of the present invention to provide a deformed ultra fine grain which is formed into a non-spherical shape and avoids aggregation.

To achieve the above object, according to the present invention, there is provided a deformed ultra fine grain comprising spherical body, and a tail-like projection extending from the surface of the spherical body.

With the above configuration, the tail-like projection exhibits a separating effect on the adjacent deformed ultra fine grains, thereby avoiding aggregation of the deformed ultra fine grains.

It is another object of the present invention to provide a producing process which can easily provide for producing bulk quantities of deformed ultra fine grains of the type described above.

To achieve the above objects, according to the present invention, there is provided a process for producing a bulk of deformed ultra fine grains each comprised of a spherical body of metal and a tail-like projection of ceramic projecting from a surface of the spherical body, comprising the steps of: melting a metal blank by plasma arc in a controlled atmosphere including a gas contributing to the formation of the ceramic, thereby forming a large number of spherical metal droplets by the clustering of evaporated particles; and precipitating and growing the ceramic by a reaction of the metal element with the gas on the surfaces of the spherical metal droplets.

With the above process, the mass production in bulk quantities of deformed ultra fine grains each comprised of the spherical body of the metal and the tail-like projection of the ceramic can be easily produced at a single melting step.

The above and other objects, features and advantages of the invention will become apparent from the following description of preferred embodiments, taken in conjunction with the accompanying drawings.

DESCRIPTION OF THE PREFERRED EMBODIMENTS

Figure 1:
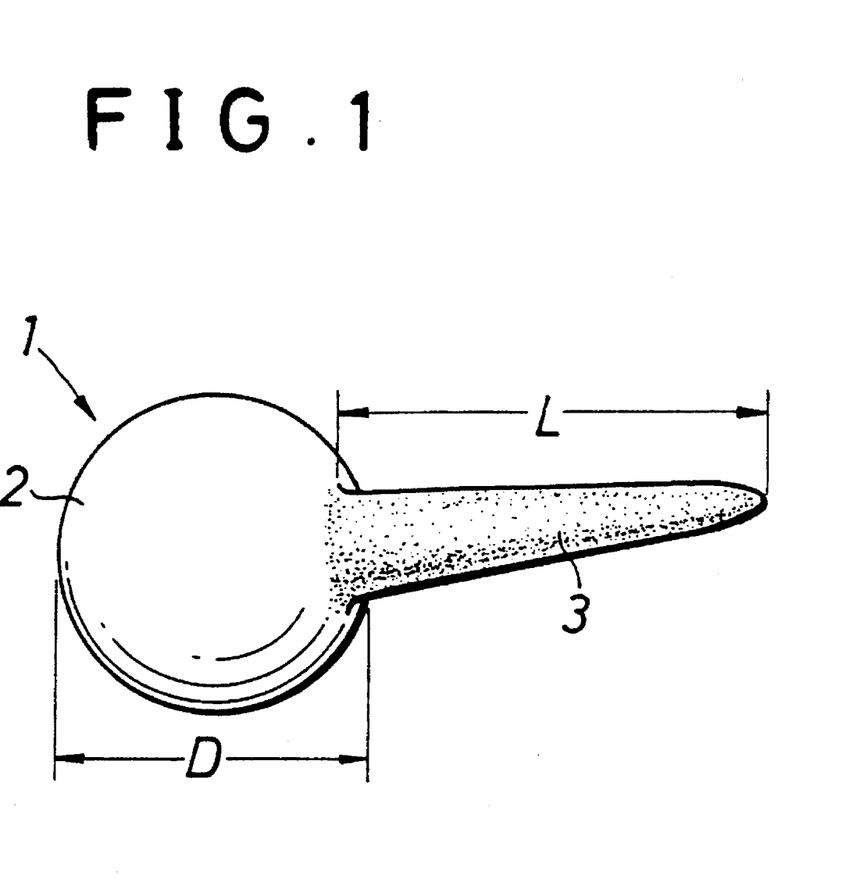
FIG. 1 is a perspective view of a deformed ultra fine grain.

Referring to FIG. 1, a deformed (heteromorphic) ultra-fine grain 1 is formed into a composite type comprising a spherical body 2 of a metal, and a tail-like projection 3 made of a ceramic and projecting from a surface of the spherical body 2. In the illustrated embodiment, the tail-like projection 3 is substantially conical in shape. The spherical body 2 has a grain size D in a range represented by $D \leq 100$ nm, and the tail-like projection 3 has a projecting length L in a range represented by $L \leq 200$ nm.

In this way, the deformed ultra-fine grain 1 has the tail-like projection 3 integrally formed thereon, so that the tail-like projection 3 exhibits a separation effect (spacing effect) on adjacent deformed ultra-fine grains 1, thereby avoiding the aggregation of the deformed ultra-fine grains 1 to provide an extremely good dispersion property.

In producing a bulk quantity of the deformed ultra-fine grains 1, a process is employed which comprises the steps of: melting a metal blank by plasma arc in a controlled atmosphere including a gas contributing to the formation of a ceramic, thereby forming a large number of spherical metal droplets by the clustering of evaporated particles; and precipitating and growing a ceramic by a reaction of the metal element with the gas on the surfaces of the spherical metal droplets.

FIGS. 2A to 2E illustrate a mechanism of formation of the deformed ultra-fine grains 1 in such producing process.

Figure 2A:
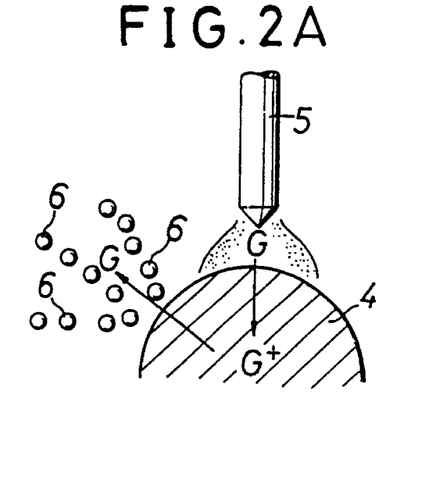
FIGS. 2A, 2B, 2C, 2D and 2E are diagrammatic illustrations for explaining a method of forming the deformed ultra fine grain of this invention.

As shown in FIG. 2A, if an alloy blank 4 used as the metal blank is melted by a plasma arc in a controlled atmosphere including a ceramic forming gas G by use of an electrode 5, the gas G is dissociated ($G^+$) into atoms by arc plasma and dissolved into the molten alloy blank 4, and then emitted out of the alloy blank 4 in the form of molecules (G). These steps of dissolution and emitting are repeated continually. During the emitting, a large number of particles 6 are actively evaporated from the alloy blank 4. In the particles 6, the concentration of the metal elements reacting with the gas G to form the ceramic is high.

Figure 2B:
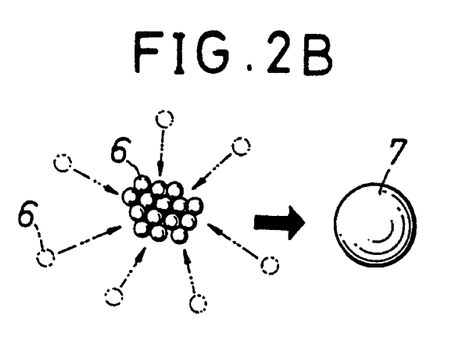

As shown in FIG. 2B, the particles 6 cluster or congregate, i.e., collide, fuse and grow with each other to form spherical metal droplets 7 having a ultra-fine grain size or diameter equal to or less than about 100 nm.

Figure 2C:
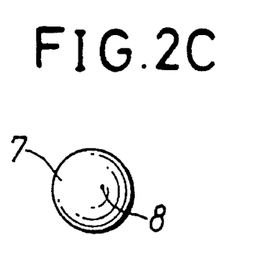

As shown in FIG. 2C, the spherical metal droplet 7 serves to form the spherical body 2. The spherical metal droplet 7 contains the metal element in excess of the content of the metal element in the spherical body 2 and hence, with the cooling of the spherical metal droplet 7, the excessive amount of the metal element is precipitated on the surface thereof to react with the gas G, thereby precipitating the ceramic 8 on the surface of the spherical metal droplet 7.

Figure 2D:
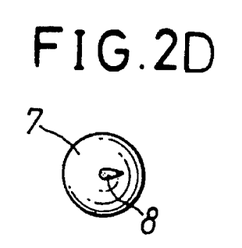

As shown in FIG. 2D, the ceramic 8 starts to precipitate and grow into a conical shape.

Figure 2E:
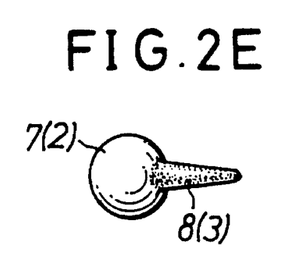

As shown in FIG. 2E, the precipitation and growth of the ceramic 8 is completed to form the tail-like projection 3. The spherical metal droplet 7 is solidified to form the spherical body 2.

A particular example of this processing and invention now will be described.

The spherical body 2 is made of Cu alloy (which will be referred to as an Al-solid solution Cu alloy hereinafter) resulting from incorporation of solid solution aluminum in an amount represented by 17 atom % $\leq$ Al $\leq$ 19 atom % i.e., in a saturated state, or an intermetallic compound $Al_4Cu_9$. The tail-like projection 3 is comprised of AlN.

In the deformed ultra-fine grain 1 having such materials, the migration of electrons is produced for the chemical bonding between the metal portion and the ceramic portion. This exerts a favorable influence on a catalytic reaction which enhances the acceptance and donation of electrons, and the deformed ultra-fine grains 1 do not tend to aggregate. Therefore, if the grains 1 are used as a catalyst element for conversion of an exhaust gas from an automobile engine, they exhibit an excellent catalytic activity. The deformed ultra-fine grains 1 are also applicable to gas, temperature and moisture sensors and other sensors.

In the production of a bulk quantity of the deformed ultra-fine grains 1, a blank comprising aluminum in a content within a range represented by 20 atom % $\leq$ Al $\leq$ 50 atom % and a balance of copper is used as the alloy blank 4, and nitrogen gas is used as the ceramic forming gas. If required, argon gas may be used along with the nitrogen gas.

In this case, if an alloy blank 4 having an aluminum content in a range represented by 20 atom % $\leq$ Al $\leq$ 30 atom %, e.g., $Cu_{70}Al_{30}$ (each of the numerical values is atom %) is used, a bulk of deformed ultra-fine grains 1 including a spherical body 2 of an Al-solid solution Cu alloy is produced. However, some deformed ultra-fine grains 1 each including a spherical body 2 of an intermetallic compound $Al_4Cu_9$ may be incorporated in a very small amount in the bulk in some cases.

If an alloy blank 4 having an Al content in a range represented by 30 atom % $\leq$ Al $\leq$ 40 atom %, e.g., $Cu_{60}Al_{40}$ is used, a bulk of a mixture of both deformed ultra-fine grains 1 each including a spherical body 2 of an Al-solid solution Cu alloy and deformed ultra-fine grains 1 each including a spherical body 2 of an intermetallic compound $Al_4Cu_9$ is produced.

Further, if an alloy blank 4 having an Al content in a range represented by 40 atom % $\leq$ Al $\leq$ 50 %, e.g., $Cu_{50}Al_{50}$ is used, a bulk of deformed ultra-fine grains 1 each including a spherical body 2 of an intermetallic compound $Al_4Cu_9$ is produced. However, some deformed ultra-fine grains 1 each including a spherical body 2 of an Al-solid solution Cu alloy may be incorporated in a very small amount in the bulk in some cases.

It is believed that the production of the intermetallic compound $Al_4Cu_9$ is started in a range represented by 30 atom % $\leq$ Al $\leq$ 40 atom %. When the content of aluminum in the alloy blank 4 is less than 20 atom %, ultra fine grains made of only the Al-solid solution Cu alloy are formed. On the other hand, if the content of aluminum the alloy blank 4 exceeds 50 atom %, ultra fine grains made of the intermetallic compound $Al_4Cu_9$ are formed.

Figure 3:
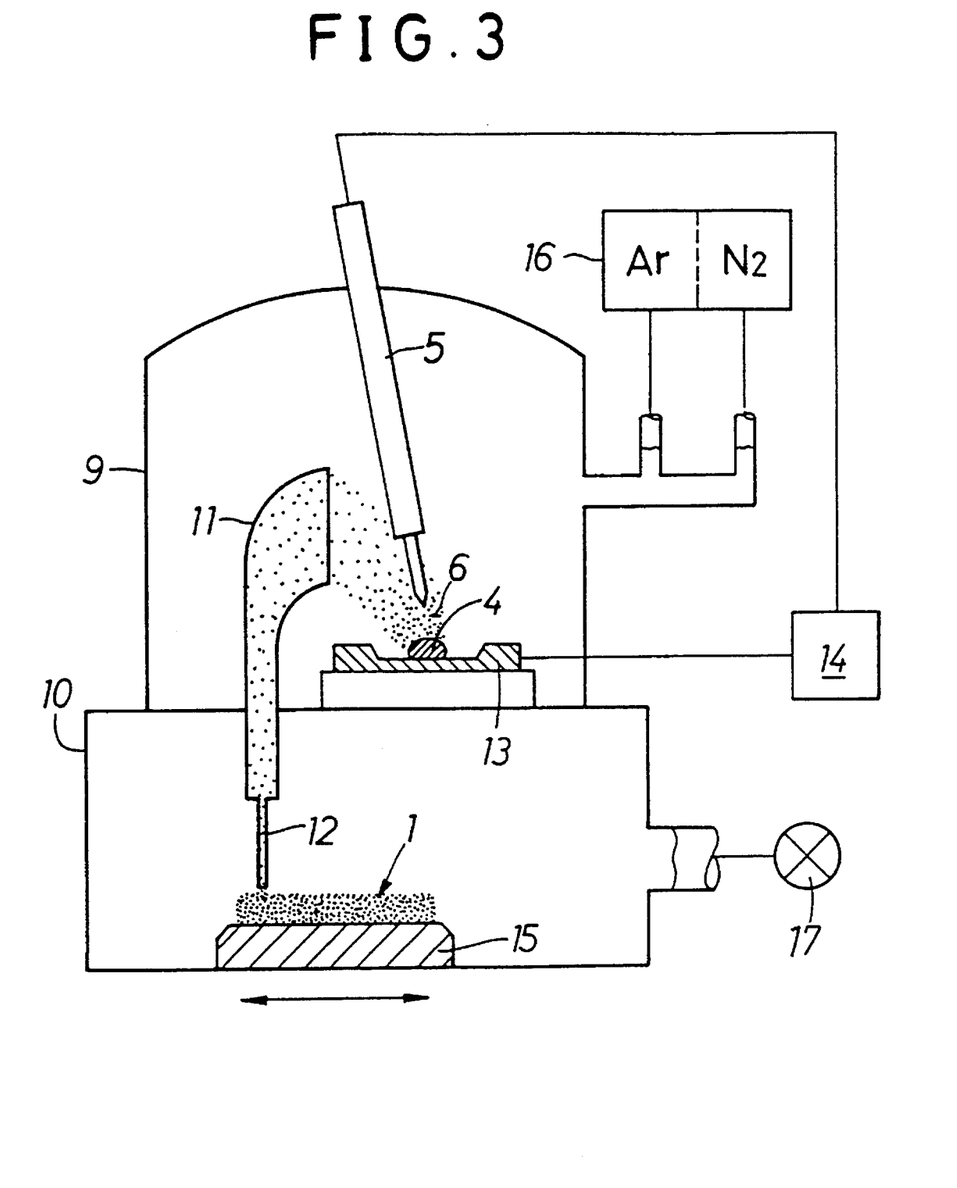
FIG. 3 is a diagrammatic illustration of an apparatus for producing the deformed ultra fine grains in bulk quantities.

FIG. 3 illustrates an apparatus for use in the production of a bulk quantity of deformed ultra-fine grains 1. This producing apparatus includes a main chamber 9, and a sub-chamber 10 mounted under the main chamber 9. The chambers 9 and 10 communicate with each other through a duct 11 and a nozzle 12 mounted on the lower end of the duct 11. A tungsten electrode 5 extending into the main chamber 9 and a copper hearth 13 within the main chamber 9 are connected to a power source 14. A movable substrate 15 is disposed in the sub-chamber 10 below the nozzle 12. The main chamber 9 is connected to a controlled-atmosphere gas supply source 16, while the sub-chamber 10 is connected to a vacuum pump 17.

An example of the production of a bulk quantity of deformed ultra-fine grains 1 using the above-described producing apparatus now will be described.

(1) A $Cu_{70}Al_{30}$ alloy blank (each of the numerical values is an atom %) 4 was placed, in an amount of 30 to 50 g, onto the hearth 13.

(2) The vacuum pump 17 was operated to evacuate the main chamber 9 and the sub-chamber 10, until the pressure within the chambers 9 and 10 reached $1\times10^{-4}$ Torrs. Then, the controlled-atmosphere gas supply source 16 was operated to supply argon and nitrogen gases into the main chamber 9. The argon and nitrogen gases in the main chamber 9 were permitted to flow through the duct 11 and the nozzle 12 into the sub-chamber 10 by the operation of the vacuum pump 17 and then flow out of the sub-chamber 10. The amount of argon and nitrogen gases supplied from the controlled-atmosphere gas supply source 16 was adjusted, such that the pressure within the main chamber 9 was brought into a steady state of 600 Torrs.

(3) A voltage was applied between the tungsten electrode 5 and the hearth 13 to generate an arc discharge, thereby melting the alloy blank 4 by plasma arc under a condition of arc current of 100–300 A. This melting caused the clusters having a large aluminum content to be evaporated, whereby deformed ultra-fine grains 1 were formed in the presence of the nitrogen gas. The deformed ultra-fine grains 1 were drawn through the duct 11 and ejected by the nozzle 12 onto the substrate 15 and accumulated thereon, thereby providing a bulk quantity of the deformed ultra-fine grains 1.

In addition, using a $Cu_{50}Al_{50}$ alloy blank (each of the numerical values is an atom %), another bulk of deformed ultra-fine grains 1 was produced under the same condition as described above.

Figure 4:
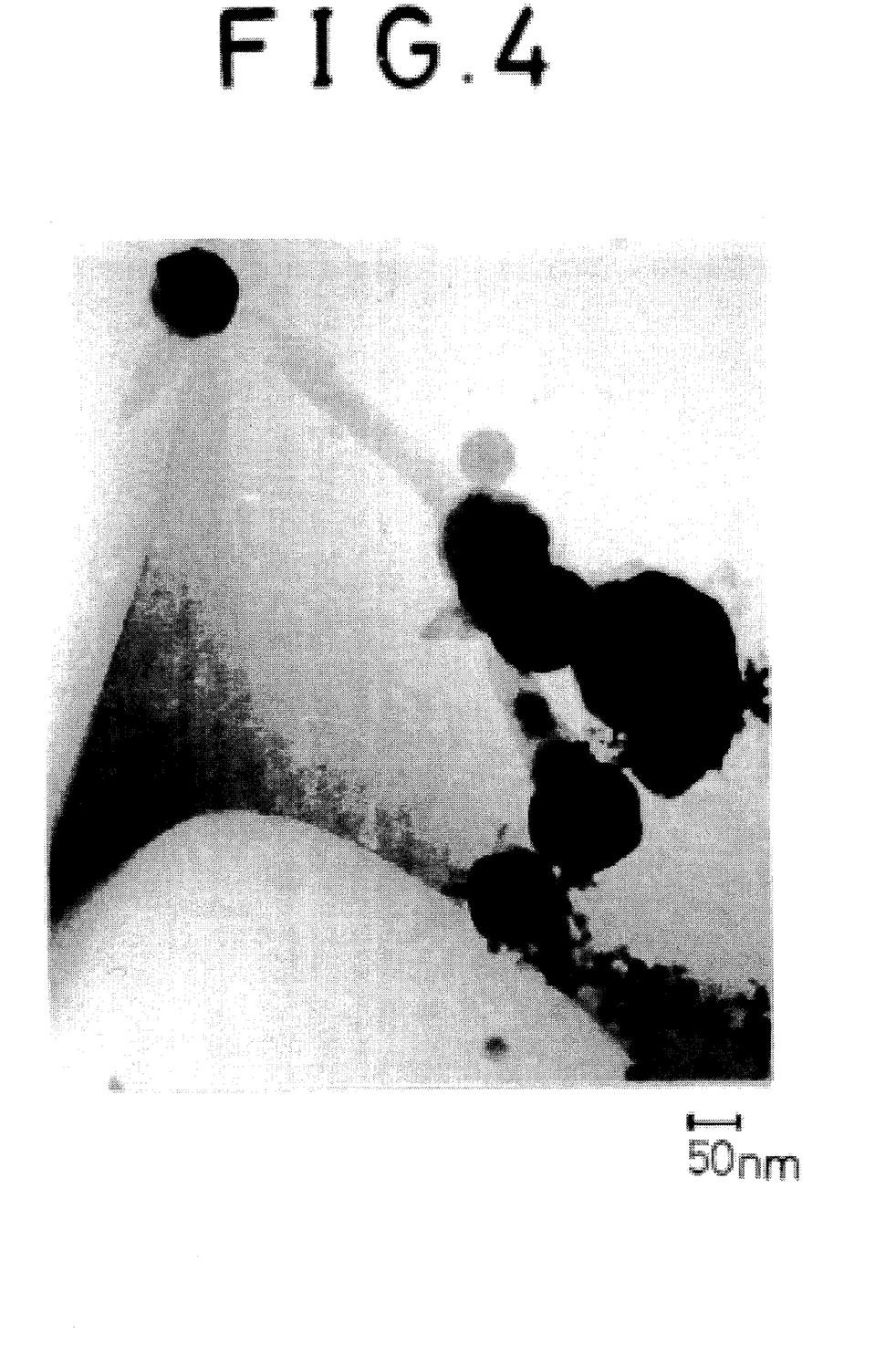
FIG. 4 is a photomicrograph showing a first example of a deformed ultra fine grain.

FIG. 4 is a photomicrograph (100,000 magnifications) of the deformed ultra-fine grain 1 produced by the above-described producing process using the $Cu_{70}Al_{30}$ alloy blank 4 (each of the numerical values is an atom %), in which the spherical body 2 and the tail-like projection 3 are observed. The grain size D of the spherical body 2 in these deformed ultra-fine grains 1 is in a range represented by 30 nm $\leq$ D $\leq$ 100 nm; the projecting length L of the tail-like projection 3 is in a range represented by 20 nm $\leq$ L $\leq$ 200 nm, and the surface area S of the entire grain including the spherical body 2 and the tail-like projection 3 is in a range represented by $3.0\times10^{-15}$ m² $\leq$ S $\leq$ $40\times10^{-15}$ m².

Figure 5:
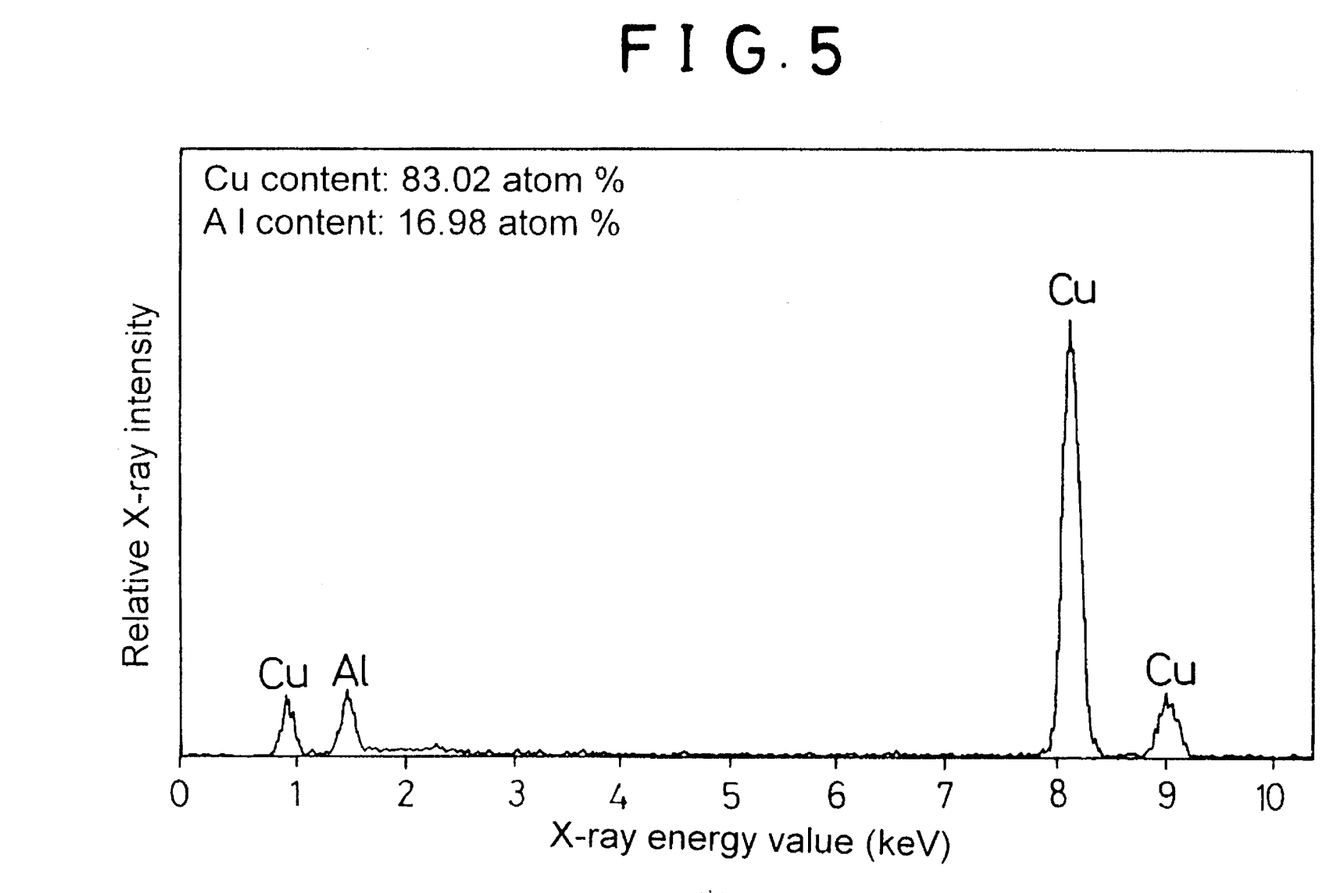
FIG. 5 is a chart illustrating results of an energy-dispersed type fluorescent X-ray analysis for a spherical body in the first example of the deformed ultra fine grain.
Figure 6:
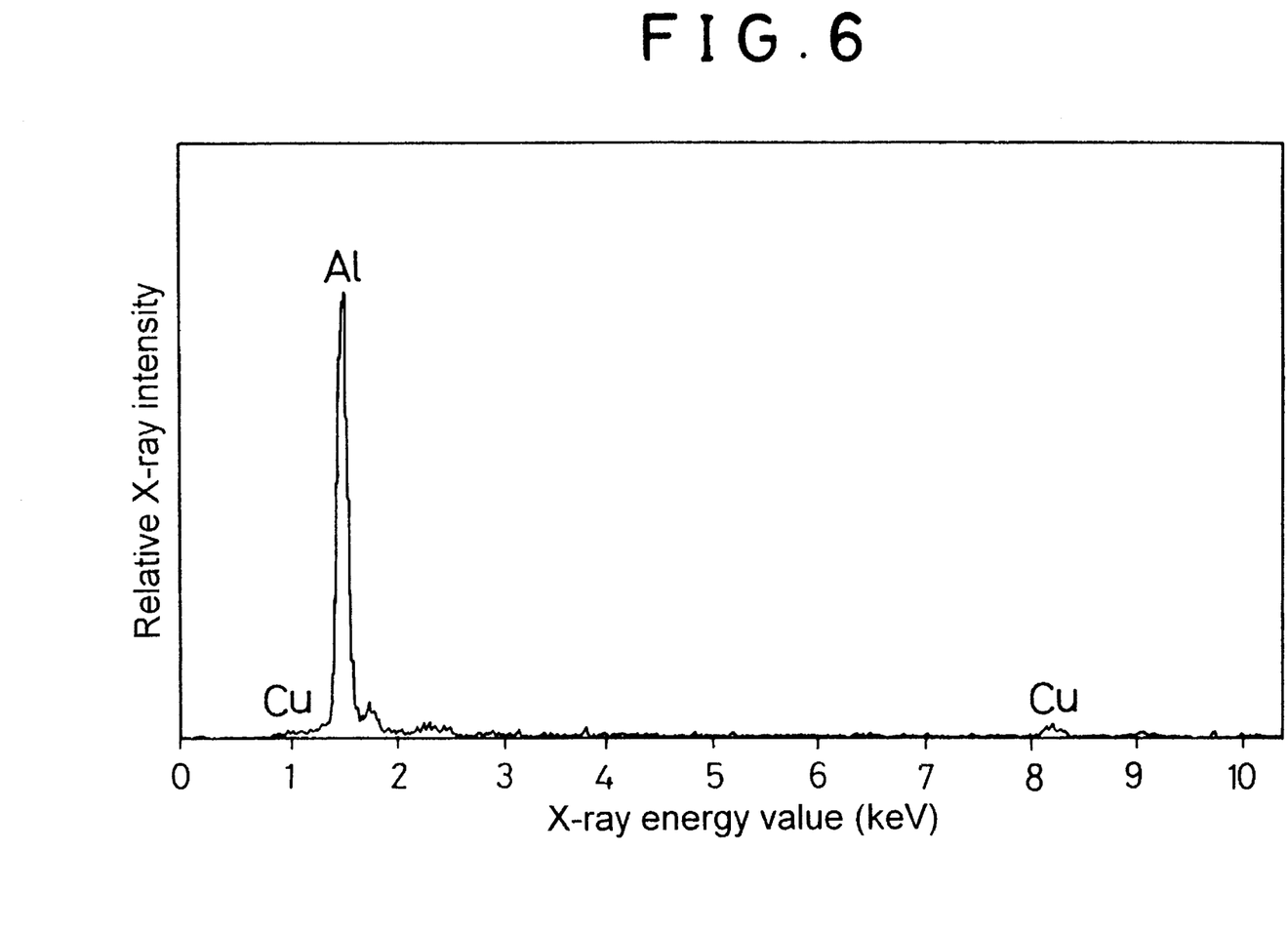
FIG. 6 is a chart illustrating results of an energy-dispersed type fluorescent X-ray analysis for a tail-like projection in the first example of the deformed ultra fine grain.

FIGS. 5 and 6 show the results of an energy-dispersed type fluorescent X-ray analysis for the deformed ultra-fine grain 1, FIG. 5 corresponding to those for the spherical body 2, and FIG. 6 corresponding to those for the tail-like projection 3. It has been ascertained from FIG. 5 that the spherical body 2 is an Al-solid solution Cu alloy comprising 83.02 atom % of copper and 16.98 atom % of aluminum. It has been also ascertained from FIG. 6 that the tail-like projection 3 includes Al and thus is AlN.

Figure 7:
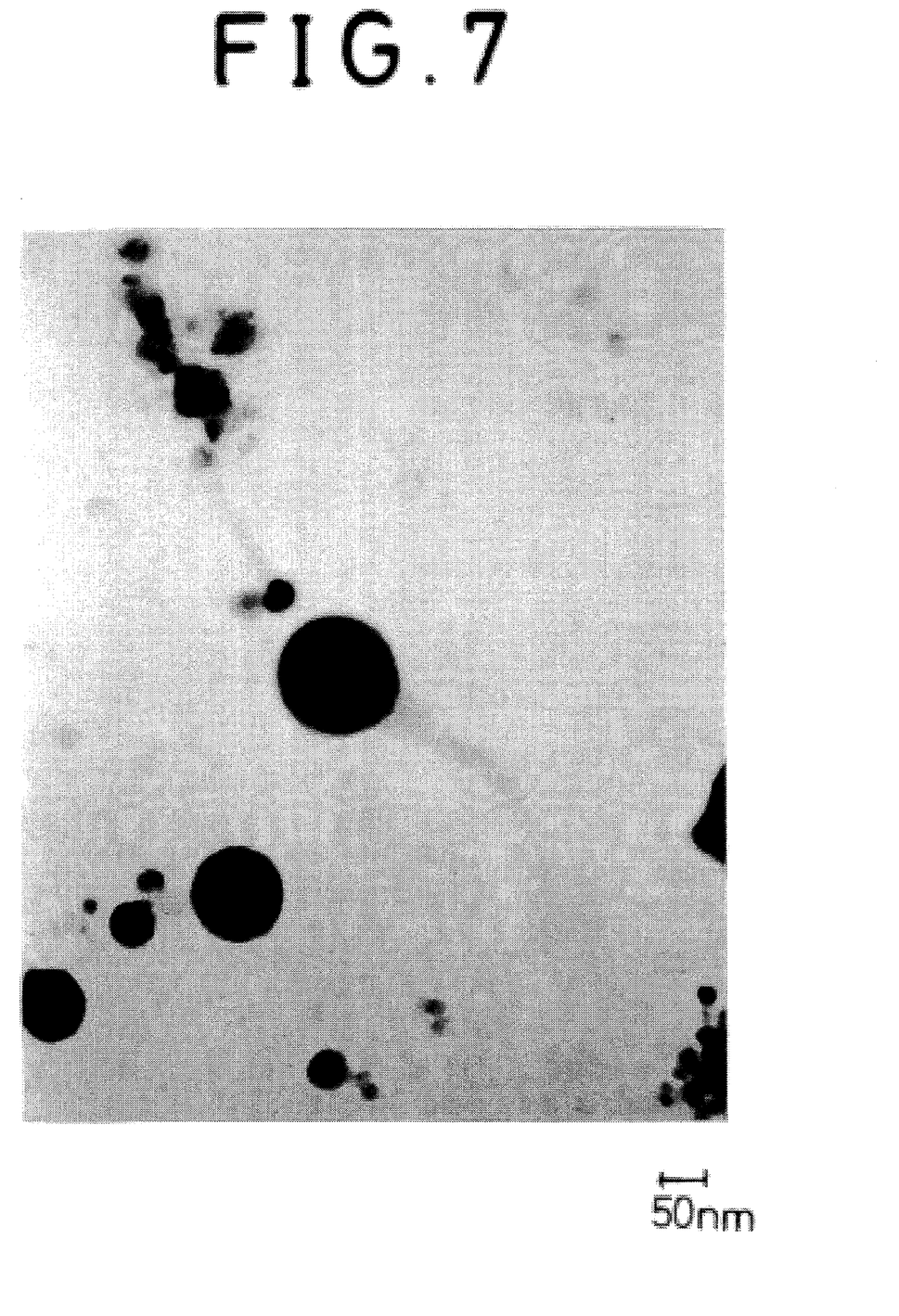
FIG. 7 is a photomicrograph showing a second example of a deformed ultra fine grain.

FIG. 7 is a photomicrograph (100,000 magnifications) of the deformed ultra-fine grain 1 produced in the above-described producing process using the $Cu_{50}Al_{50}$ alloy blank 4 (each of the numerical values is an atom %), wherein the spherical body 2 and the tail-like projection 3 are observed. The grain size D of the spherical body 2 in these deformed ultra-fine grains 1 is in a range represented by 20 nm$\leq$D$\leq$80 nm; the projecting length L of the tail-like projection 3 is in a range represented by 20 nm$\leq$L$\leq$200 nm, and the surface area S of the entire grain including the spherical body 2 and the tail-like projection 3 is in a range represented by $1.5\times 10^{-15}$ m$^2 \leq S \leq 30\times 10^{-15}$ m$^2$.

Figure 8:
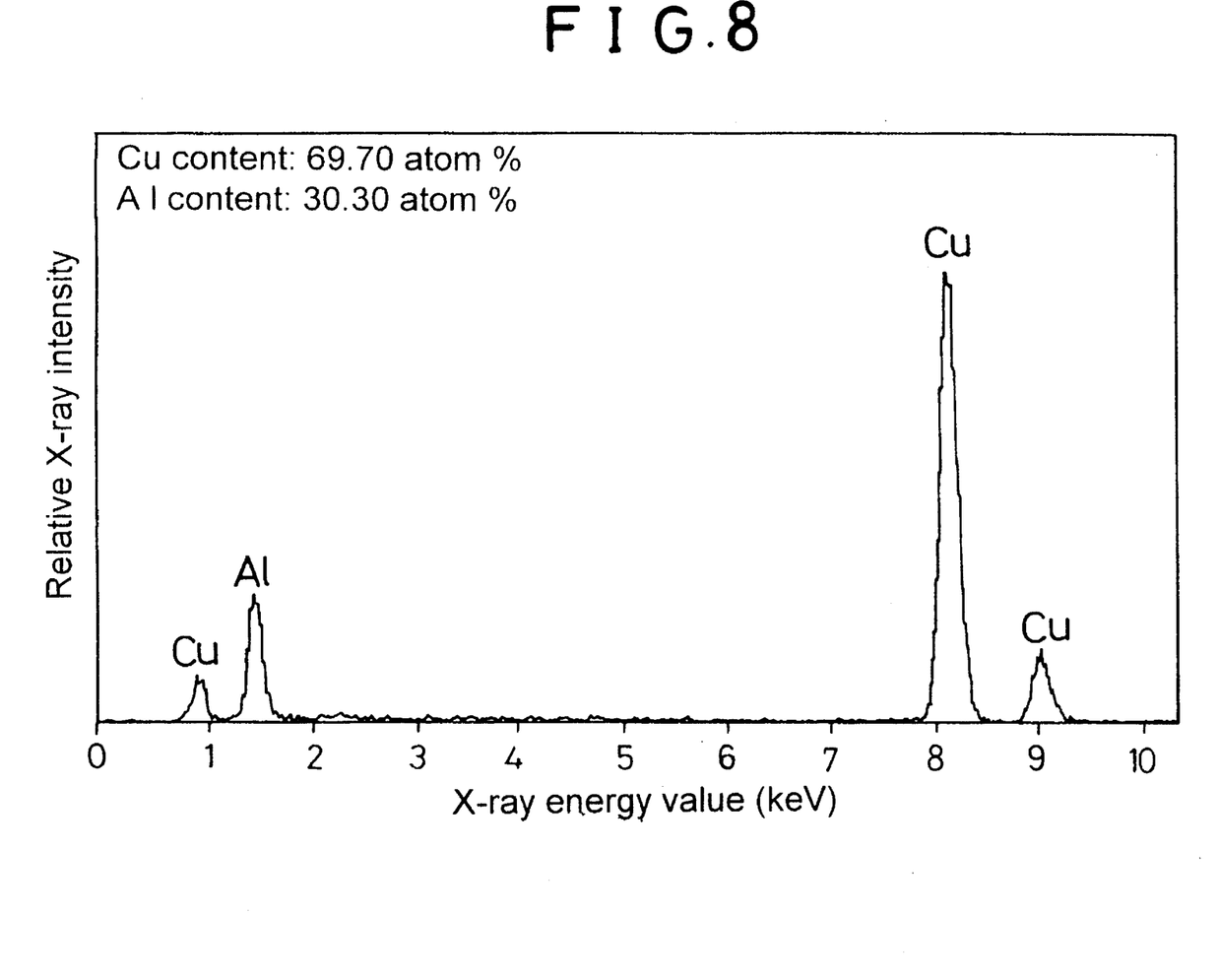
FIG. 8 is a chart illustrating results of an energy-dispersed type fluorescent X-ray analysis for a spherical body in the second example of the deformed ultra fine grain.
Figure 9:
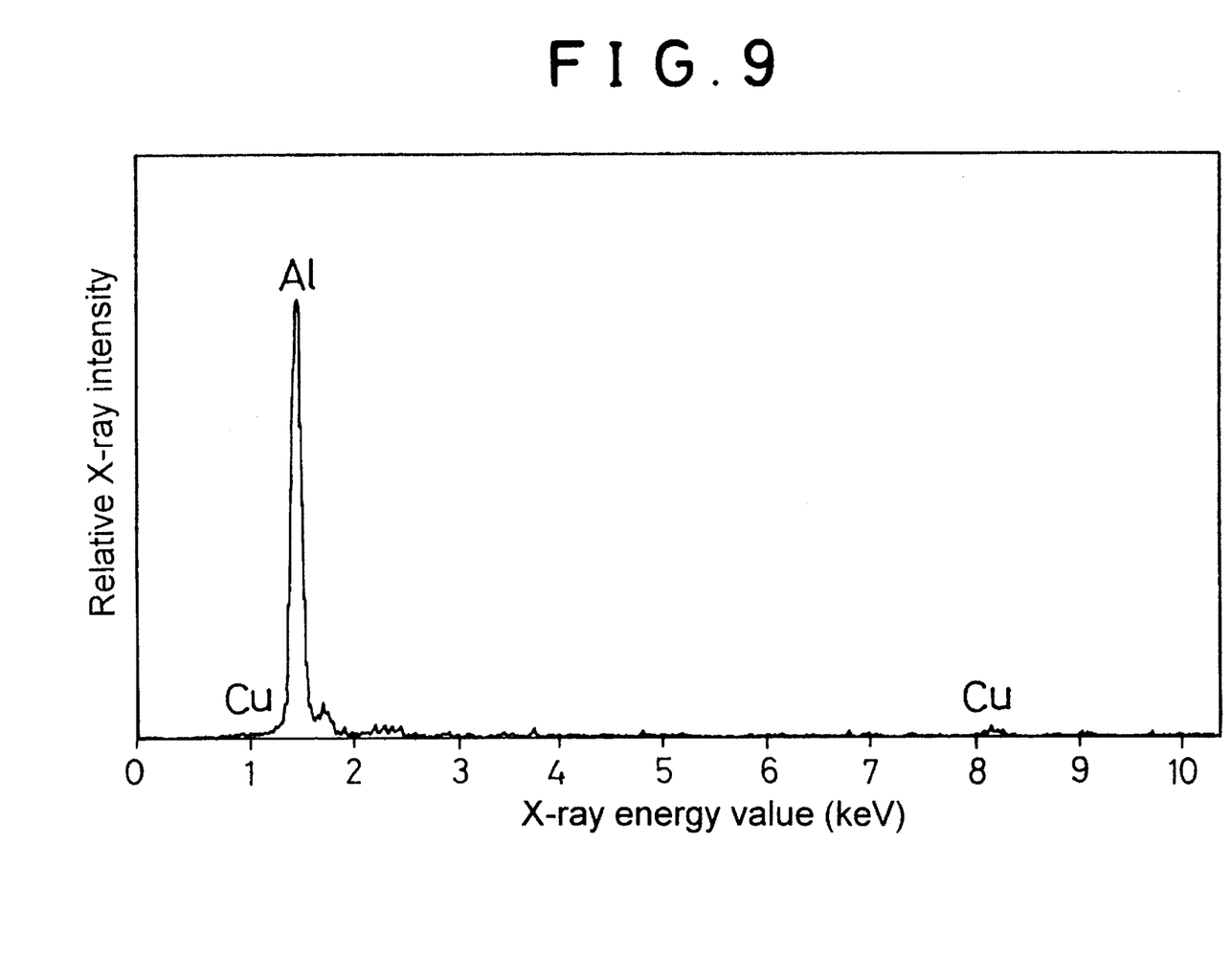
FIG. 9 is a chart illustrating results of an energy-dispersed type fluorescent X-ray analysis for a tail-like projection in the second example of the deformed ultra fine grain.

FIGS. 8 and 9 show the results of an energy-dispersed type fluorescent X-ray analysis for the deformed ultra-fine grain 1, FIG. 8 corresponding to those for the spherical body 2, and FIG. 9 corresponding to those for the tail-like projection 3. As apparent from FIG. 8, the composition of the spherical body 2 comprises 69.70 atom % of copper and 30.30 atom % of aluminum. Additionally, from results of an X-ray diffraction, it has been ascertained that the spherical body 2 is of an intermetallic compound $Al_4Cu_9$. It has also been ascertained from FIG. 9 that the tail-like projection 3 incudes Al and thus is AlN.

An NOx conversion test, which will be described below, was carried out for the deformed ultra-fine grain 1 in order to examine a function of the deformed ultra-fine grain 1 serving as a catalyst element for the conversion of the exhaust gas from an automobile engine.

The preparation of the catalyst was carried out by incorporating the deformed ultra-fine grains 1, each including the spherical body 2 made of the intermetallic compound $Al_4Cu_9$ into $\gamma$-$Al_2O_3$ grains, such that the amount of grains 1 incorporated became 10% by weight, mixing them sufficiently, forming the mixture of the grains into pellets, and sintering the formed pellets.

In the NOx conversion test, helium gas containing 2,000 ppm of NO was allowed to flow through a catalyst layer having 1 g of the catalyst supported thereon at a flow rate of 100 ml/min during a predetermined time under a condition of a reaction temperature of 500° C., and then the gas passed through the catalyst layer was analyzed by a gas chromatography to determine an invert ratio of NO.

For comparison, catalysts were prepared using, as a catalyst element, a mixture of 90% by weight of ultra fine grains made of $Al_4Cu_9$ having a grain size D in a range represented by 20 nm$\leq$D$\leq$100 nm, and 10% by weight of ultra fine grains made of AlN having a grain size D in a range represented by 20 nm$\leq$D$\leq$120 nm, and using single ultra fine grains made of the above-described intermetallic compound $Al_4Cu_9$ as another catalyst element. Using these catalysts, a similar NOx conversion test was carried out.

Table 1 shows the results of the NOx conversion test using these catalysts.

TABLE 1

| Catalyst element | Invert ratio of NO (%) | |
|---|---|---|
| | after 30 minutes | after 24 hours |
| Deformed ultra-fine grains | 35.3 | 35.1 |
| Mixture of ultra- | 28.1 | 28.0 |

TABLE 1-continued

| Catalyst element | Invert ratio of NO (%) | |
|---|---|---|
| | after 30 minutes | after 24 hours |
| fine grains Single ultra-fine grains | 28.4 | 26.5 |

It can be seen from Table 1 that the catalyst prepared by using the deformed ultra-fine grains 1 as the catalyst element exhibits an excellent catalytic activity which is sustained for a long time. On the other hand, by a comparison of the catalyst prepared by using the mixture of ultra-fine grains as the catalyst element with the catalyst prepared by using the single ultra-fine grains as the catalyst element, it was ascertained that their initial performances were substantially the same but after a lapse of 24 hours, there appeared a distinct difference between those two catalysts. This is considered to be due to the catalytic activity of the AlN ultra fine grains in the mixture of ultra fine grains and/or the suppression of the aggregation of the $Al_4Cu_9$ ultra fine grains.

What is claimed is:

1. A deformed ultra fine grain comprising a spherical body, and a tail projection extending from a surface of the spherical body, said tail projection comprising a different material than that of said spherical body.

2. A deformed ultra fine grain according to claim 1, wherein said spherical body is of a metal.

3. A deformed ultra fine grain according to claim 1, wherein said tail projection is of a ceramic.

4. A deformed ultra fine grain comprising a spherical body, and a tail projection extending from a surface of the spherical body, wherein said spherical body is of a metal, and said tail projection is of a ceramic.

5. A deformed ultra fine grain comprising a spherical body of a Cu alloy with an aluminum solid solution incorporated therein in a range represented by 17 atom %$\leq$Al$\leq$19 atom %, and a tail projection of AlN extending from a surface of the spherical body.

6. A deformed ultra fine grain comprising a spherical body of intermetallic compound $Al_4Cu_9$, and a tail projection of AlN extending from a surface of the spherical body.

7. A deformed ultra fine grain according to claims 1, 2, 3, 4, 5 or 6, wherein a grain size D of said spherical body is in a range represented by D$\leq$100 nm, and a projecting length L of said tail projection is in a range represented by L$\leq$200 nm.

8. A process for producing a bulk of deformed ultra fine grains with each comprised of a spherical body of a metal and a tail projection of a ceramic extending from a surface of a spherical body, comprising the steps of:

melting a metal blank by plasma arc in a controlled atmosphere including a gas contributing to the formation of said ceramic, thereby forming a large number of spherical metal droplets by clustering of evaporated particles; and precipitating and growing the ceramic by a reaction of the metal with said gas on a surface of the spherical metal droplets.

9. A process for producing a bulk of deformed ultra fine grains with each grain comprising at least one of a spherical body of Cu alloy with an aluminum solid solution incorporated therein in a range represented by 17 atom %$\leq$Al$\leq$19 atom % and a spherical body of intermetallic compound $Al_4Cu_9$ and having a tail projection of AlN extending from a surface of the spherical body, said process comprising the steps of: melting an alloy blank consisting of aluminum in a range represented by 20 atom %≦Al≦50 atom % and a balance of copper by plasma arc in a controlled atmosphere including nitrogen gas, thereby forming a large number of spherical droplets by clustering of evaporated particles; and precipitating and growing AlN on surfaces of said spherical droplets.

10. A process for producing a bulk of deformed ultra fine grains comprising the steps of: melting a metal blank by plasma arc in a controlled atmosphere for evaporating a multiplicity of particles; causing said particles to cluster for thereby forming a large number of spherical metal droplets with each spherical metal droplet having a multiplicity of evaporated particles; and causing precipitating and growing of a ceramic tail projection on a surface substantially of each spherical metal droplet by a reaction of the metal in the spherical metal droplet with a gas in said controlled atmosphere to form a said deformed ultra fine grain.

11. A process according to claim 10, wherein, said spherical metal droplet is comprised of at least one of a Cu alloy with an aluminum solid solution incorporated therein in a range represented by 17 atom %≦Al≦19 atom % and an intermetallic compound $Al_4Cu_9$.

12. A process according to claim 11 wherein, said gas is nitrogen, and said tail projection is formed of AlN.

13. A deformed ultra fine grain comprising a spherical body and a projection extending from the surface of the spherical body, wherein said spherical body is made of a metal, and said projection is made of a ceramic.

14. A deformed ultra fine grain comprising a spherical body of a Cu alloy with an aluminum solid solution incorporated therein in a range represented by 17 atom %≦Al≦19 atom %, and a projection of AlN extending from a surface of the spherical body.

15. A deformed ultra fine grain comprising a spherical body of intermetallic compound $Al_4Cu_9$, and a projection of AlN extending from a surface of the spherical body.

16. A deformed ultra fine grain according to claims 1, 2, 3, 4, 5 or 6 wherein a grain size D of said spherical body is in a range represented by 20 nm≦D≦100 nm and a projecting length L of said tail projection is in a range represented by 20 nm≦L≦200 nm.

17. A process for producing a bulk of deformed ultra fine grains with each comprised of a spherical body of a metal and a projection of a ceramic extending from a surface of a spherical body, comprising the steps of:

melting a metal blank by plasma arc in a controlled atmosphere including a gas contributing to the formation of said ceramic, thereby forming a large number of spherical metal droplets by clustering of evaporated particles; and precipitating and growing the ceramic by a reaction of the metal with said gas on a surface of the spherical metal droplets.

18. A process for producing a bulk of deformed ultra fine grains with each grain comprising at least one of a spherical body of Cu alloy with an aluminum solid solution incorporated therein in a range represented by 17 atom %≦Al≦19 atom % and a spherical body of intermetallic compound $Al_4Cu_9$ and having a projection of AlN extending from a surface of the spherical body, said process comprising the steps of:

melting an alloy blank consisting of aluminum in a range represented by 20 atom %≦Al≦50 atom % and a balance of copper by plasma arc in a controlled atmosphere including nitrogen gas, thereby forming a large number of spherical droplets by clustering of evaporated particles; and precipitating and growing AlN on surfaces of said spherical droplets.

19. A process for producing a bulk of deformed ultra fine grains comprising the steps of:

melting a metal blank by plasma arc in a controlled atmosphere for evaporating a multiplicity of particles; causing said particles to cluster for thereby forming a large number of spherical metal droplets with each spherical metal droplet having a multiplicity of evaporated particles; and causing precipitating and growing of a ceramic projection on a surface substantially of each spherical metal droplet by a reaction of the metal in the spherical metal droplet with a gas in said controlled atmosphere to form a said deformed ultra fine grain.

20. A process according to claim 19 wherein, said spherical metal droplet is comprised of at least one of a Cu alloy with an aluminum solid solution incorporated therein in a range represented by 17 atom %≦Al≦19 atom % and an intermetallic compound $Al_4Cu_9$.

21. A process according to claim 20 wherein, said gas is nitrogen, and said projection is formed of AlN.

22. A catalyst material comprising a plurality of deformed ultra fine grains, said ultra fine deformed grains comprising a spherical body and a projection extending from the surface of the spherical body, and wherein said projection comprises a different material than that of said spherical body.

23. A catalyst material according to claim 22 wherein said spherical body is made of a metal, and said projection is made of ceramics.

24. A catalyst material according to claim 23, wherein said projection is a tail.

* * * * *